2,705,245

2,705,245

(α-TRIFLUOROMETHYLBENZHYDRYLOXY) TRIALKYLAMINES AND THEIR SALTS

Frederick H. Norton, Concord, Calif., assignor to The Dow Chemical Company, Midland, Mich., a corporation of Delaware No Drawing. Application September 9, 1953,
Serial No. 379,281

5 Claims. (Cl. 260—570)

This invention relates to a new class of amines and their salts and is particularly concerned with (1) (α-trifluoromethylbenzhydryloxy)trialkylamines having the formula

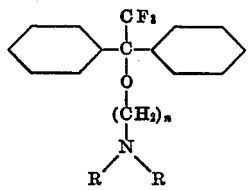

wherein $n$ represents one of the integers 2 and 3, and each R represents an alkyl radical containing from 1 to 4 carbon atoms, inclusive, and (2) hydrohalides of these amines. Representative members of this class of compounds have been prepared and isolated. The free amines are high-boiling liquids and the salts are crystalline solids. The compounds have utility as active toxic ingredients of parasiticide compositions and especially for the inhibition of fungi and bacteria. Among the organisms which have been controlled with aqueous solutions of compounds of the present invention are *Salmonella typhosa*, *Staphylococcus aureus*, *Aspergillus terreus*, and *Rhizopus nigricans*.

The new amine compounds are conveniently prepared by the reaction of α-trifluoromethylbenzhydrol of the formula

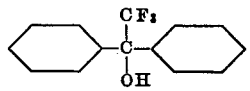

with an N-(ω-haloalkyl)-dialkylamine in the presence of sodium ethoxide, and an excess of absolute ethanol. Good yields of the desired product are obtained when substantially equi-molar proportions of the benzhydrol compound, amine and sodium ethoxide are employed, although small molar excess of any of these do not interfere with the reaction.

In carrying out the preparation of the new amine compounds, the α-trifluoromethylbenzhydrol conveniently is dissolved in a prepared solution of the sodium ethoxide in absolute ethanol. The haloalkyl dialkylamine is then added portionwise and with agitation to the reaction mixture, and the latter thereafter heated to its boiling temperature and under reflux for a period of time sufficient to complete the reaction. Generally, heating for from 0.5 to 1.5 hours at the boiling temperature of the mixture is sufficient. Sodium chloride is formed as a by-product during the reaction and is recovered as a precipitate by cooling and filtering the crude reaction product. The filtrate from this operation is fractionally distilled under reduced pressure to recover alcohol and any residual unreacted α-trifluoromethylbenzhydrol and amine as low-boiling fractions. The desired (α-trifluoromethylbenzhydryloxy)trialkylamines are obtained as liquids of high-boiling point at low pressures.

The hydrohalides of the (α-trifluoromethylbenzhydryloxy)trialkylamines are readily prepared by dissolving the free amine compounds in diethyl ether and introducing gaseous hydrogen halide into the ether solution. Addition reaction takes place at room temperature with precipitation of the amine hydrohalides from solution. The latter are recovered by filtration, and may be further purified if desired by recrystallization from a suitable organic solvent such as benzene or methyl ethyl ketone.

The following examples illustrate the invention but are not to be construed as limiting:

Example 1

4.6 grams (0.2 mole) of metallic sodium was added to 250 milliliters (4.38 moles) of absolute ethanol to obtain an ethanol solution of sodium ethoxide. This solution was placed in a glass-lined reactor vented through a water-cooled condenser, and 50 grams (0.2 mole) of α-trifluoromethylbenzhydrol dissolved therein. 21.0 grams (0.155 mole) of N-(2-chloroethyl)diethylamine was introduced dropwise into the reaction mixture with agitation over a period of several minutes. The mixture was thereafter heated to its boiling temperature and under reflux for a period of 45 minutes. The crude reaction mixture was then cooled, filtered to remove sodium chloride, and fractionally distilled under reduced pressure. A fraction of 19 grams (0.054 mole) boiling at 150°–153° C. at 0.5 millimeter pressure was recovered and found to be N-[2-(α-trifluoromethylbenzhydryloxy)-ethyl]diethylamine.

Example 2

17 grams (0.048 mole) of the product obtained in Example 1 was dissolved in 200 milliliters of diethyl ether. Anhydrous hydrogen chloride was introduced into this solution at room temperature, whereupon a crystalline product precipitated. When no further precipitate was obtained, the reaction mixture was filtered and the residue recrystallized from benzene and dried to obtain 14 grams (0.036 mole) of the hydrochloride of N-[2-(α-trifluoromethylbenzhydryloxy)-ethyl]diethylamine. This product was a crystalline solid melting at 158°–159.5° C.

Example 3

In a similar fashion, 166 grams (0.66 mole) of α-trifluoromethylbenzhydrol was dissolved in an ethanol solution of sodium ethoxide prepared from 15 grams (0.66 mole) of metallic sodium and 200 milliliters (3.5 moles) of absolute ethanol. To the resulting solution, 71.7 grams (0.67 mole) of N-(2-chloroethyl)dimethylamine was added dropwise and with agitation over a short period of time. The foregoing additions were carried out in a glass reactor vented through a water-cooled condenser.

When all of the amine had been added, the mixture was heated to its boiling temperature and under reflux for a period of one hour and then cooled to room temperature. The crude reaction product was filtered to separate by-product sodium chloride and thereafter fractionally distilled to recover 144 grams (0.445 mole) of N-[2-(α-trifluoromethylbenzhydryloxy)-ethyl]dimethylamine boiling at 138°–153° C. at 2 millimeters pressure.

Example 4

144 grams (0.445 mole) of the foregoing product was dissolved in diethyl ether, and anhydrous hydrogen chloride passed into the solution to precipitate the amine hydrochloride. Introduction of the hydrogen chloride was continued until no further precipitate was obtained. The reaction mixture was then filtered, and the residue recrystallized from methyl ethyl ketone and dried. As the product from this recrystallization, there was obtained 42 grams (0.117 mole) of N-[2-(α-trifluoromethylbenzhydryloxy)-ethyl]diamine hydrochloride melting at 197.7°–198.5° C.

Example 5

In substantially the manner described in Example 1, 0.5 mole proportions of α-trifluoromethylbenzhydrol and N-(3-chloronormalpropyl)diethylamine are reacted together in a reaction solvent of absolute ethanol containing 0.5 mole of sodium ethoxide. The amine is added to the other reactants portionwise with stirring and the reaction mixture thereafter heated to boiling temperature and under reflux for one hour. At the end of this time, the reaction mixture is cooled to room temperature, filtered to remove sodium chloride, and the filtrate fractionally distilled under reduced pressure to recover the desired N - [3 - (α - trifluoromethylbenzhydryloxy) - normalpropyl]diethylamine as a high boiling liquid, soluble in alcohol and somewhat soluble in water.

*Example 6*

A portion of the amine product as obtained in Example 5 is dissolved in anhydrous diethyl ether and anhydrous hydrogen iodide introduced into the ether solution to precipitate the desired hydroiodide product. When no further precipitation is obtained, the reaction mixture is filtered and the residue recrystallized from methyl ethyl ketone to obtain N-[3-(α-trifluoromethylbenzhydryloxy)-normalpropyl]diethylamine hydroiodide as a high-melting crystalline compound readily soluble in water.

*Example 7*

0.5 mole of α-trifluoromethylbenzhydrol is dissolved in a solution of 0.5 mole of sodium ethoxide in 250 milliliters of absolute ethanol. To the resulting solution, 0.5 mole of N-(2-chloroethyl)dinormalbutylamine is added portionwise and with stirring over a short period of time. The reaction mixture is then heated to boiling temperature and under reflux for one hour, cooled, filtered to remove by-product sodium chloride and the filtrate fractionally distilled under reduced pressure. As a high boiling fraction from this distillation, there is obtained N - [2 - (α - trifluoromethylbenzhydryloxy) - ethyl]dinormalbutylamine. This compound is a liquid readily soluble in ethanol and somewhat soluble in water.

*Example 8*

A portion of the product as described in Example 7 is dissolved in anhydrous diethyl ether. Anhydrous hydrogen bromide is introduced into the resulting solution to accomplish the precipitation of an amine hydrogen bromide product. When no more precipitation is obtained, the reaction mixture is filtered and the residue recrystallized from methyl ethyl ketone and dried. The product so obtained is N-[2-(α-trifluoromethylbenzhydryloxy) - ethyl]dinormalbutylamine hydrobromide, a water-soluble crystalline solid.

The α-trifluoromethylbenzhydrol employed as a reactant in the foregoing examples may be prepared by adding 1 part by weight of ethyl trifluoroacetate to a diethylether solution of 2 parts by weight of phenyl magnesium bromide. At completion of the reaction, the ether solution is poured into a mixture of cracked ice and concentrated hydrochloric acid (excess), and the water immiscible organic layer separated and distilled to recover diethylether. The residue from this distillation, is fractionated under reduced pressure to obtain α-trifluoromethylbenzhydrol boiling at 123°–124° C. at 1.0 millimeter pressure. This compound is a white crystalline solid melting at 73°–74° C.

I claim:

1. A compound of the class consisting of (1) substituted trialkylamines of the formula

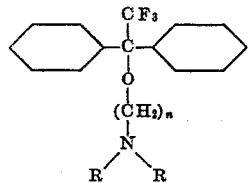

wherein $n$ represents one of the integers 2 and 3, and each R represents an alkyl radical containing from 1 to 4 carbon atoms, inclusive, and (2) hydrohalides of these amines.

2. 2-(α-trifluoromethylbenzhydryloxy)-triethylamine.
3. 2 - (α - trifluoromethylbenzhydryloxy) - triethylamine hydrochloride.
4. N - [2 - (α - trifluoromethylbenzhydryloxy) - ethyl]-dimethylamine.
5. N - [2 - (α - trifluoromethylbenzhydryloxy) - ethyl]-dimethylamine hydrochloride.

No references cited.